June 29, 1954 — G. E. HONNERT — 2,682,143
SCISSOR ACTION SICKLE BAR MOWER
Filed Jan. 7, 1953
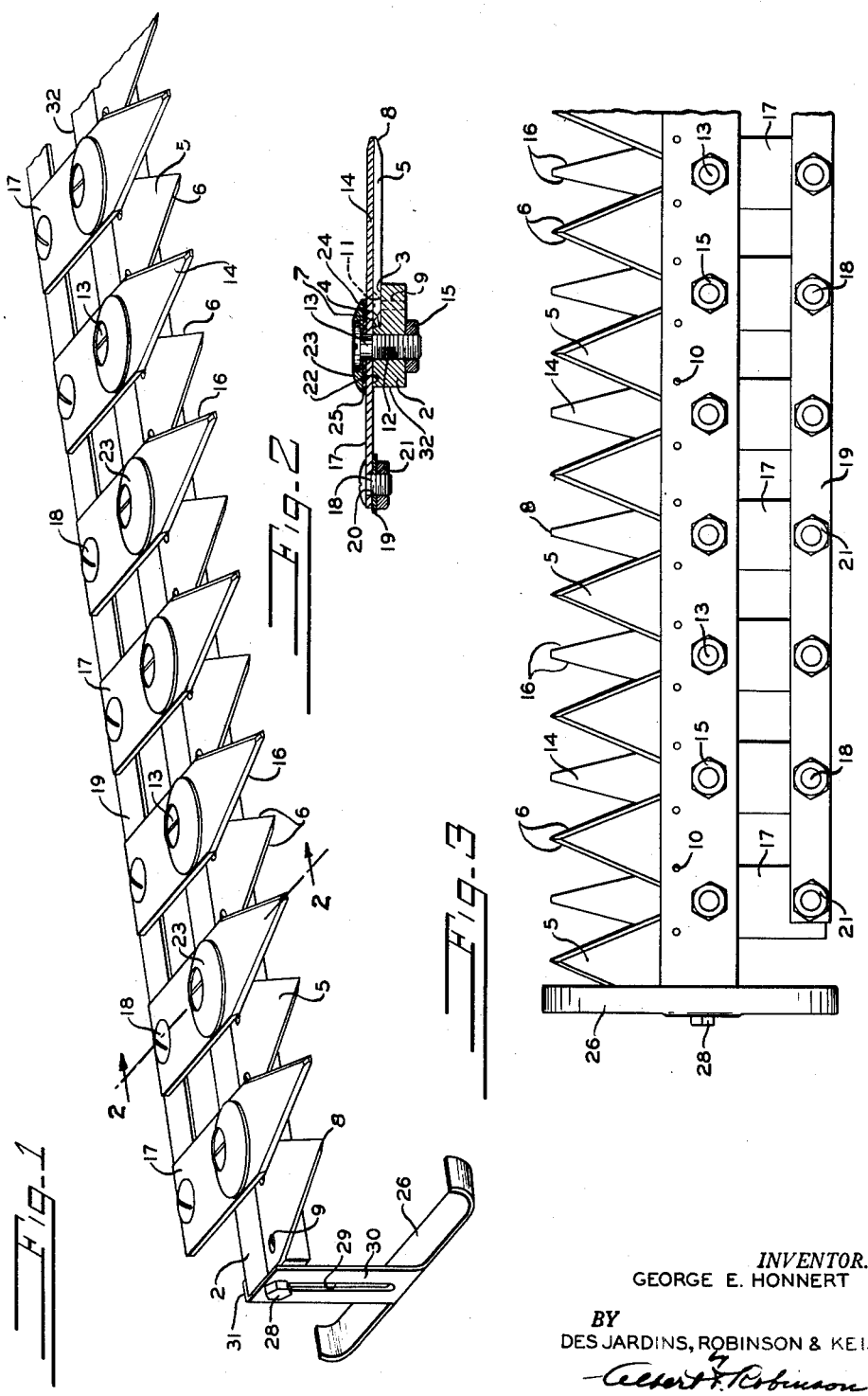
INVENTOR.
GEORGE E. HONNERT
BY
DES JARDINS, ROBINSON & KEISER
HIS ATTORNEYS

Patented June 29, 1954

2,682,143

UNITED STATES PATENT OFFICE 2,682,143

SCISSOR ACTION SICKLE BAR MOWER

George E. Honnert, Cincinnati, Ohio

Application January 7, 1953, Serial No. 330,007

6 Claims. (Cl. 56—293)

1

This invention relates to a mower, and more particularly to one of a scissors-like type in which the sickle or cutter bar is provided with a row of stationary cutters with opposite lateral cutting edges for cooperation with a row of cutters pivoted to the bar, also provided with opposite lateral cutting edges, to be operated by any suitable power means connected with the pivoted cutters for actuating them relatively to the stationary ones.

Heretofore, the stationary cutters have been of special construction or in the form of a finger, or carried by a finger, fitted to the bar, thereby making a rather complicated construction and requiring careful machining of the fingers for accurately fitting them to the bar. Even with the fingers properly machined, one or more of them may be slightly tilted in respect to the others so as to be out of alignment when fitted in place on the bar if the machined surface of each of the fingers is not parallel with the bar. However this may be, each of the fingers has to be accurately machined and fitted to the bar, and if any one is found to be too tilted in respect to the others, it has to be replaced with another one that will be accurately aligned. Then, too, in the scissors or clipper type mower, as well as in the reciprocating scythe type, the cutting side edges of the stationary cutters do not extend to their tip ends. Their cutting edges are set back a substantial distance from the tip ends, and, oftentimes, a front overhanging portion of the stationary finger, more particularly in the reciprocating type, is provided to form a slot in which the scythe or movable cutters reciprocate. As a result of the cutting edges being set back from the tip ends of the cutters or fingers, the mower cannot be used for cutting close up to walls, hedges, and other obstacles, with the result that more or less hand clipping is required. In the present invention no fingers are required for the cutters, the stationary cutters being seated directly on the bar, and so seated thereon that there is a minimum stress and strain on the fastening means. The fastening means simply holds the cutters in place with the stress and strain against the cutters taken by the bar.

Accordingly, one of the main objects of the present invention is a mower constructed with the cutting edges of both sets of cutters substantially coextensive in length.

Another object of the invention is in providing the bar with a top front rabbet edge with the stationary cutters seated therein with their rear edges abutting the shoulder of the rabbet edge,

2

Another object of the invention is to provide a mower in which the stationary cutters are fastened more securely and with the least stress and strain exerted upon the fastening means.

Another object of the invention is in having the pivoted cutters mounted so that they are yieldably held in shearing action against the stationary cutters.

Further objects, and objects relating to details of construction and economies of operation, will readily appear from the detailed description to follow. In one instance, I have accomplished the objects of my invention by the device and means set forth in the following specification. My invention is clearly defined and pointed out in the appended claims. A structure constituting a preferred embodiment of my invention is illustrated in the accompanying drawings, forming a part of the specification, in which:

Fig. 1 is a perspective view of one embodiment of the invention.

Fig. 2 is a cross sectional view on line 2—2 of Fig. 1.

Fig. 3 is a bottom view of the device.

Referring specifically to the drawings in which like numerals designate like parts, numeral 2 is a steel bar rabbeted on its top front surface side to provide a longitudinal groove 3 and a shoulder 4. A series of triangle cutters 5, with opposite lateral cutting edges 6, are seated in the groove of the bar with their base edges 7 abutting the shoulder and the narrow free tip ends 8 projecting in front of the bar. The cutters 5 are secured to the bar by two fastening screws 9 screw-threadedly connected in screw sockets 10 spaced throughout the length of the bar. The heads 11 of the screws are countersunk within the cutters so that they will be flush or below the top surface of the cutters.

Screw sockets 12 are also properly spaced throughout the length of the bar for receiving the screw-threaded ends of bolts 13 which pivotally connect the pivoted cutters 14 thereto. The screws are secured by lock nuts 15. The pivoted cutters 14 have opposite lateral cutting edges 16, and they project in front of the bar commensurate in length with the length of the stationary cutters and in alternating relation therewith. There is a rearward shank 17 on each of the pivoted cutters extending for any desired length, each being pivoted at 18 with an operating bar 19. The pivot 18 is screw-threaded into a socket 20 in the operating bar and locked by the lock nut 21, similar to lock nut 15.

The bottom side surfaces of the pivoted cutters directly abut the top side surface 22 of the bar 2, back of the groove 3, with their lateral edges beveled to have the cutting edges at the bottom side surface of the cutters flush with the top side surface of the bar. The lateral edges of the stationary cutters are beveled to have their cutting edges at the top sides flush with cutting edges of the pivoted cutters.

A metal washer 23 is associated with each of the pivot bolts 13, it being provided with an annular body portion 24 having a central recess in which the head of bolt 13 is countersunk. A resilient washer 25, preferably non-metallic, is inserted between the metal washer 23 and the top surface of each of the cutters for yieldably holding the pivoted cutters adjacent the stationary cutters in shearing relation but will permit them to yield in the event any hard objects should get between the cutters that are too resistant to being sheared. The washers are of any suitable elastic material, preferably neoprene, nylon or the like, to resist wear and deterioration.

The stationary cutters are made from a strip of sheet steel of conventional gauge, and the groove in the rabbeted edge is formed to a depth equal to the gauge of the cutters or the strip steel from which the cutters are formed. Therefore, the butt-ends of the stationary cutters will fit in the groove with their top surfaces flush with the top surface of the bar, thereby requiring nothing more than the formation of the groove in the bar for accurately fitting them therein and to the bar. The stationary cutters require no fitting to the bar since they are cut from a strip of a gauge equal to the depth of the groove in the bar, and need only to have the holes properly spaced for the fastening screws.

A conventional runner or shoe 26 is attached at, or near, the outer end of the bar, preferably adjustable vertically in any conventional manner so that the bar may be elevated or lowered for determining how close the grass is to be cropped. The shoe can be adjustably connected with the end of the bar by means of bolt 28 fitting in a vertically elongated slot 29 in an arm 30 having a flange 31 bearing against the rear side 32 of the bar.

Any suitable power driving mechanism (not shown) can be connected to the reciprocating bar for operating the pivoted cutters in respect to the stationary cutters.

I am aware that there may be various changes in details of construction without departing from the spirit of my invention, and, therefore, I claim my invention broadly as indicated by the appended claims.

Having thus described my invention, what I claim as new and useful and desire to secure by U. S. Letters Patent, is:

1. A mower comprising an elongated bar having a longitudinally rabbeted top side front edge to provide a seating surface in front of a shoulder, a series of stationary triangular cutters seated side by side with their base ends abutting against said shoulder and their opposite free ends projecting in front of the bar, their top surfaces being flush with the non-rabbeted top side of the bar, said cutters having opposite lateral cutting edges extending substantially throughout the length of their free ends, cooperating triangular cutters pivoted to the non-rabbeted portion of the bar with their free ends coextensive in length with the free ends of the stationary cutters, and means for actuating the pivoted cutters.

2. The mower set forth in claim 1 in which the pivoted cutters are yieldably held in shearing relation with the stationary cutters.

3. A mower comprising an elongated bar having a longitudinally rabbeted top side front edge to provide a seating surface in front a shoulder, a series of triangular cutters seated side by side with their base ends abutting against the shoulder and having opposite lateral cutting edges flush with the non-rabbeted top side of the bar, and cooperating cutters pivoted to the non-rabbeted top side of the bar with opposite lateral cutting edges flush with the top surface of said bar.

4. The mower set forth in claim 3 in which the pivoted cutters are yieldably held in shearing relation with the stationary cutters.

5. A mower comprising an elongated bar having a longitudinally rabbeted top side front edge to provide a seating surface in front of a shoulder equal in depth to the gauge of a steel strip from which a series of cutters are formed, a series of stationary triangular cutters cut from the steel strip and seated side by side with their base ends abutting against said shoulder and their opposite free ends projecting in front of the bar, lateral cutting edges throughout the full length of the free ends of the cutters, cooperating triangular cutters pivoted to the bar in alternation with the stationary cutters and coextensive in length with the cutting length of the stationary cutters, means for yieldably holding the pivoted cutters in shearing relation with the stationary cutter, and means for actuating the pivoted cutters.

6. A mower comprising an elongated bar having a row of cutters mounted on the upper side thereof in abutting edge to edge relation and provided with opposite lateral cutting edges on a projection in front of the bar, the entire top surface of each of the cutters being in a common horizontal plane, a row of cooperating cutters pivoted to the bar with opposite lateral cutting edges also on a projection in front of said bar, the bottom side surface of the pivoted cutters being in a common horizontal plane and moving in contact with substantially the entire top surfaces of two adjacent stationary cutters, and means for actuating the pivoted cutters.

References Cited in the file of this patent

UNITED STATES PATENTS

| Number | Name | Date |
|---|---|---|
| 470,578 | Kidd | Mar. 8, 1892 |
| 1,071,110 | Stover | Aug. 26, 1913 |
| 1,144,542 | Hammel | June 29, 1915 |
| 1,604,726 | Stauter | Oct. 26, 1926 |